Figure 1:
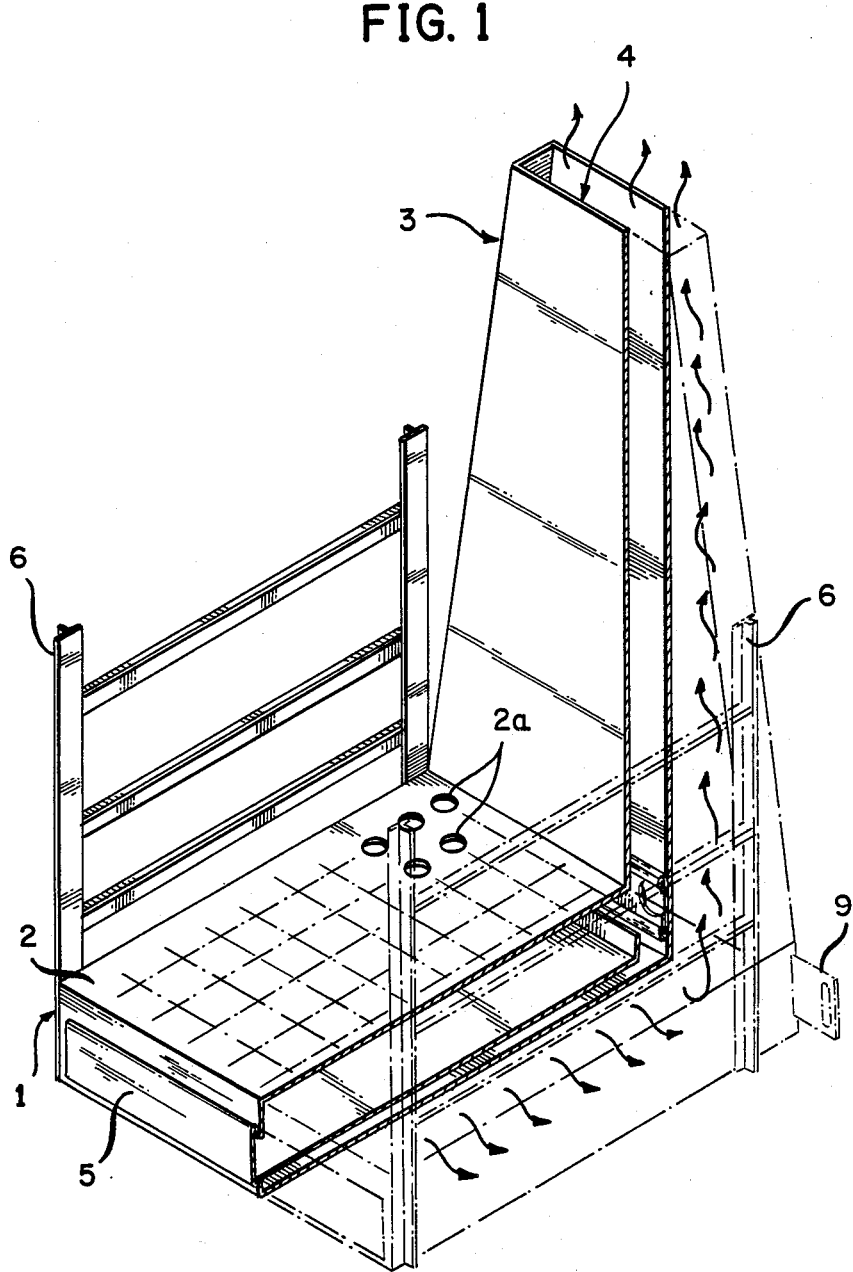

United States Patent [19]
Pibernat

[11] Patent Number: 4,907,568
[45] Date of Patent: Mar. 13, 1990

[54] DOWNDRAFT BARBECUE

[75] Inventor: Thierry Pibernat, Graulhet, France

[73] Assignee: Adly Chamy, Toulouse, France

[21] Appl. No.: 196,944

[22] Filed: May 20, 1988

[30] Foreign Application Priority Data

May 22, 1987 [FR] France ............... 87 07292

[51] Int. Cl.$^4$ ........................... A47J 27/58
[52] U.S. Cl. ............... 126/25 R; 126/9 R; 126/540
[58] Field of Search ........... 126/25 R, 8, 276, 9 R, 126/524, 540

[56] References Cited

U.S. PATENT DOCUMENTS

| | | | |
|---|---|---|---|
| 282,235 | 7/1883 | Stern | 126/25 R |
| 2,143,999 | 1/1939 | Rosson | 126/25 R |
| 2,168,388 | 8/1939 | Bemis | 126/25 R |
| 2,520,067 | 8/1950 | Sagen | 126/8 |
| 3,391,682 | 7/1968 | King et al. | 126/25 R |
| 3,769,901 | 11/1973 | Phillips | 126/25 |
| 4,489,706 | 12/1984 | Hait | 126/25 R |

FOREIGN PATENT DOCUMENTS

| | | |
|---|---|---|
| 703166 | 8/1967 | Belgium . |
| 0212750 | 3/1987 | European Pat. Off. . |
| 2804579 | 8/1979 | Fed. Rep. of Germany . |
| 3312041 | 10/1984 | Fed. Rep. of Germany . |
| 577233 | 9/1924 | France . |
| 2116952 | 7/1972 | France . |

*Primary Examiner*—James C. Yeung
*Assistant Examiner*—Christopher Hayes

[57] ABSTRACT

The more or less greasy food to be grilled on the barbecue is placed on a grill above the burning coal. The coal is carried by an air-permeable support. Smoke, produced by the grease drops falling on the burning coal, is prevented from reascending and consequently from contacting the food to be grilled by a suction, carried out at the level of the coal support. This suction is carried out by creating a rising gas flow current in the thermally-conducting exhaust conduit. The conduit is heated by the coal itself used for producing the heat under the grill. The conduit communicates with a chamber, where the upper wall of the chamber forms the coal support. The rising gas flow current in the exhaust conduit produces a suction in the up-down sense of direction at the level of the coal support.

18 Claims, 4 Drawing Sheets

DOWNDRAFT BARBECUE

The present invention relates to a portable or fixed barbecue. This barbecue is distinguished from conventional barbecues in that the smoke which is produced by the burning grease is deflected in such a way that the contact between the buring grease and the food to be grilled is avoided.

Conventionally, in a barbecue, the food to be grilled is placed on the grill above the coal fire or its equivalent. A rising hot air current carries the produced heat up to said food. Air can be fed to the fire at a lower level or at a level even with that of the fire.

Thr grease dropping onto the fire burns partially and produces a smoke which rises with said ascending hot air current. This smoke, which comprises essentially partially burnt grease, can have a carcinogenic effect.

It is known from the German Patent DE No. 3,312,041, which describes a barbecue, that the fire source is placed outside of the area where the melted grease can drop. In that German Patent, it is advised to place the fire source outside of the range or area above which the food is placed on a grill or grid. The melted grease drops onto the area which does not contain any fire, and can be removed.

The main inconveniences of this barbecue are:
the cooking surface is reduced,
the heat is carried to the food to be grilled by the outer contour of the zone of the grilling, which results in an inhomogeneous grilling of the food,
a very large part of the heat produced by the fire rises vertically with the ascending hot air current and, consequently, cannot be effectively used for the cooking.

For these reasons, the present invention discloses a barbecue where the entire grill surface can be used, where the fire is disposed below the food to be grilled, all while avoiding, at the same time, the rising of the smoke produced by the melted grease that drops on the fire.

The barbecue, which is the subject-matter of this invention, carries a support, which is permeable to air, for carrying the coal or an equivalent to be burned, above which there is placed the grill carrying the food to be grilled. The barbecue is essentially characterized in that the said coal support constitutes the upper wall of a chamber which communicates with a rising exhaust conduit, where the side wall of the said coal support is thermally conducting.

Figure 2:
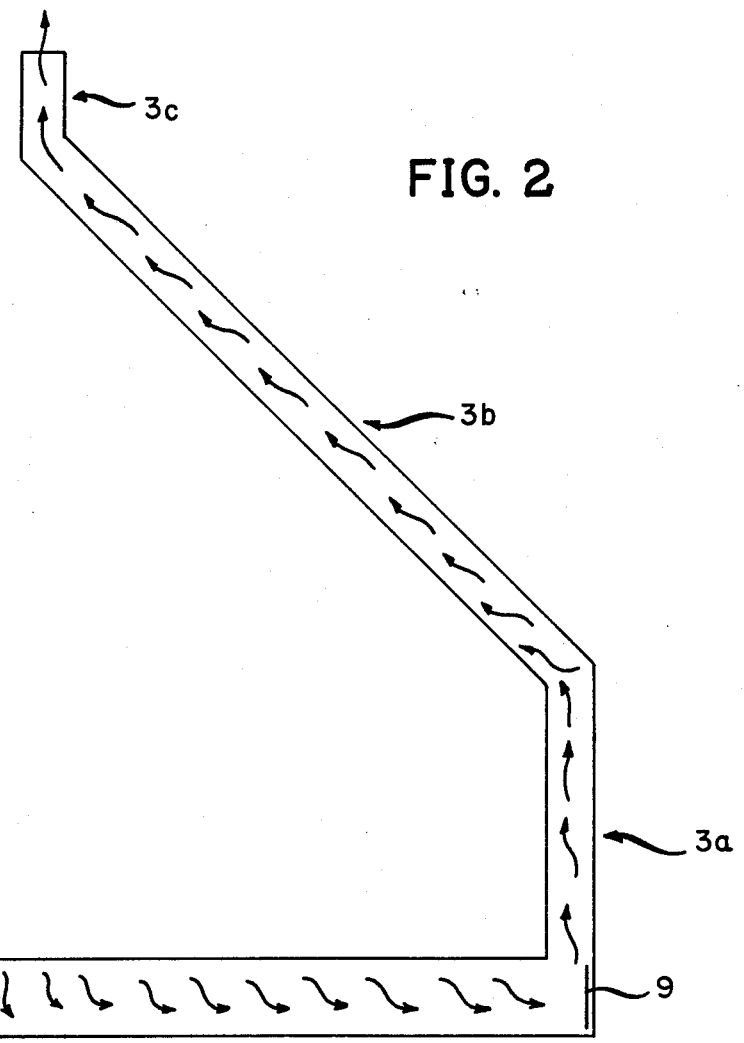
Figure 3:
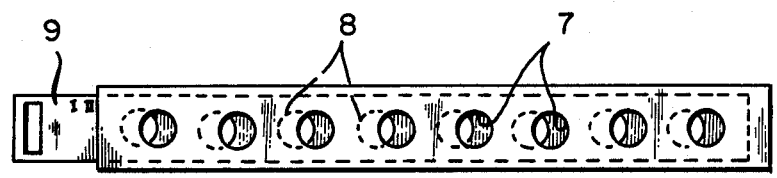
Figure 2A:
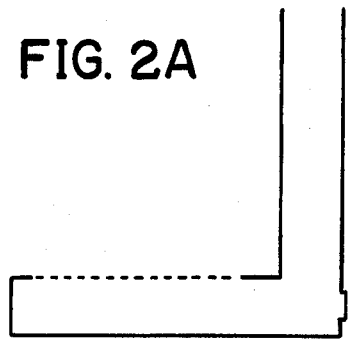
Figure 2B:
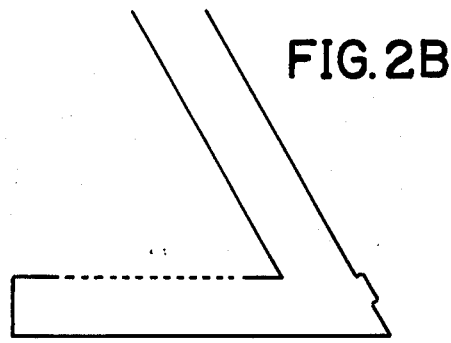
Figure 2C:
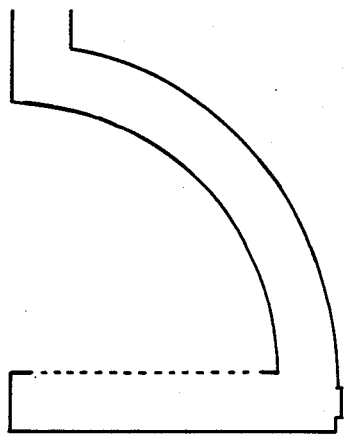
Figure 2D:
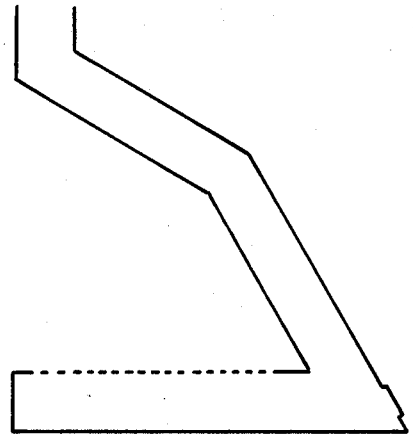
Figure 2E:
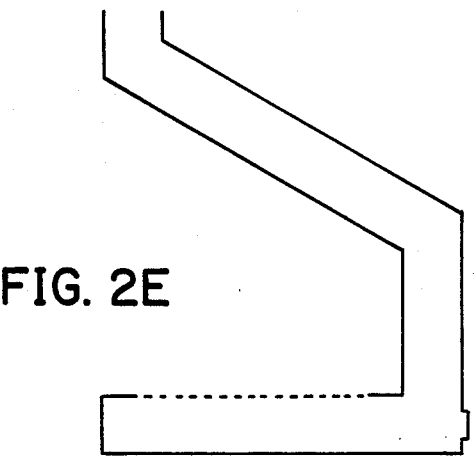

The present invention can be better understood by the reading of the below-detailed description and accompanying drawings, where:

FIG. 1 is a perspective and sectional view of the barbecue,

FIG. 2 is a schematic side view representing a variant of the embodiment of the exhaust conduit, FIG. 2A is a schematic side view representing a variant of the embodiment of the exhaust conduit, FIG. 2B is a schematic side view representing another variant of the embodiment of the exhaust conduit, FIG. 2C is a schematic side view representing yet another variant of the embodiment of the exhaust conduit, FIG. 2D is a schematic side view representing yet another variant of the embodiment of the exhaust conduit, FIG. 2E is a schematic side view representing yet another variant of the embodiment of the exhaust conduit, FIG. 3 is a schematic view which represents certain arrangements that can be carried out of the chamber in order to facilitate first the lighting and to adjust thereafter the amount of air to be deflected.

Figure 4:
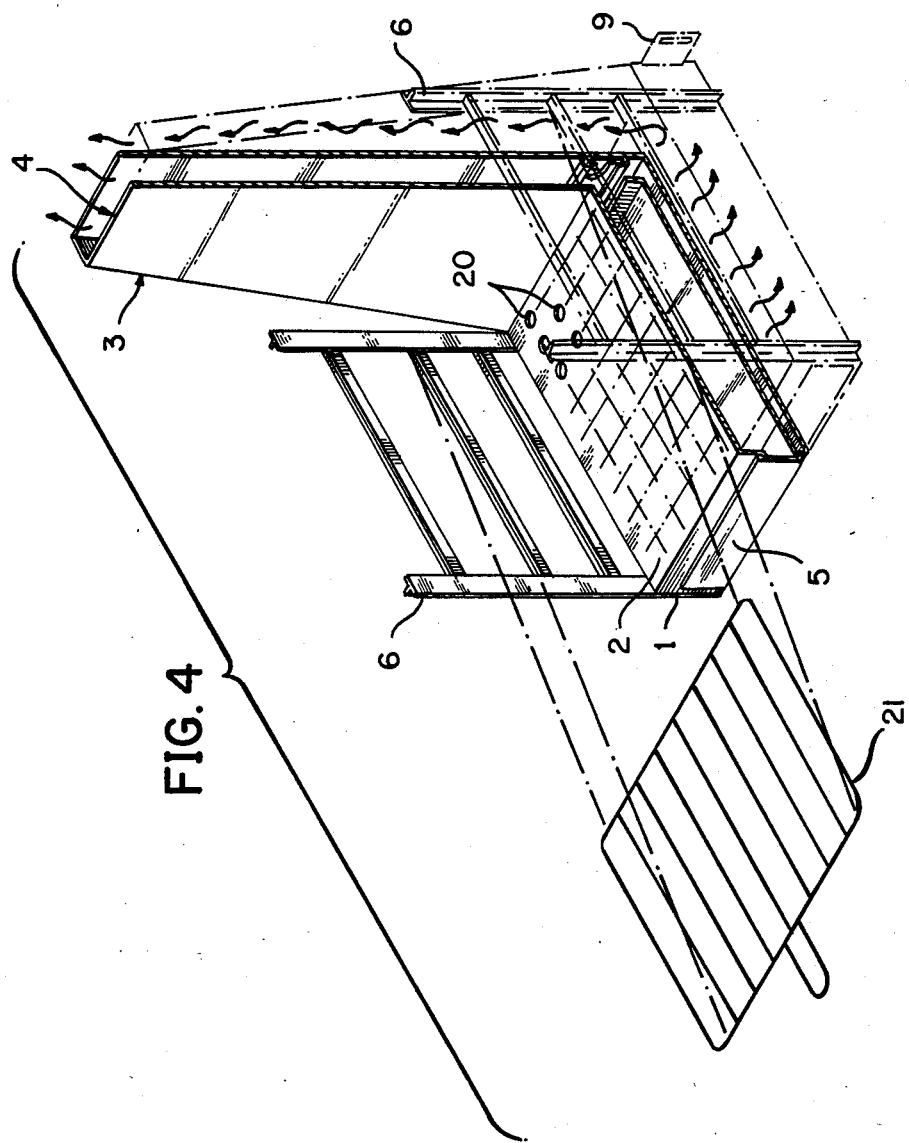

FIG. 4 is an exploded prospective view of the embodiment of FIG. 1.

The barbecue according to the invention can be formed of a chamber (1), where the upper wall is permeable to air. This wall serves to carry the coal or equivalent to be burned and can be made up, for example, of a support (2) provided with several holes (2a). The chamber is in communication with a rising exhaust conduit, where the side wall of the exhaust conduit on the side of said coal support is thermally conductive.

The said conduit can have several shapes. It is preferably flat and where the cross-section at the output, where the smoke is ejected into the air, is smaller than that at the base, where it is in communication with the chamber. The conduit (3), given by way of example, is upright, where the rectangular section is widest at its base and decreases in width toward the exit.

The large wall (4) on the side of the coal support has to be thermally conductive.

The barbecue shown in FIG. (1) has a chamber where the upper wall is rectangular but it is of course possible that the said chamber can have any other shape. The conduit (3) is in communication with the chamber (1) parallel to its rear side wall and at the end of the coal support. It is well understood that the said conduit can be connected differently to the said chamber, for example, it can be connected to any side wall or even to the coal support itself; the condition always to be respected for this connection is that the said conduit is in communication with the inside of the said chamber. For convenience, the chamber can have a drawer (5) for the ashes.

Members (6) can be designed to receive the grill 21, which is not shown, onto which the food to be grilled has to be placed.

The operation principle of the barbecue is the following:
the coal or the wood, for example, is placed onto the support (2) and burned,
the wall (4) of the conduit (3) as well as the air contained therein is heated up,
a rising hot current is created in the said conduit, and the speed of this current is accelerated by the shape given to the conduit,
this rising air current causes the suction of air through the perforations (2a) of the coal support, which causes the inversion of the flames,
the food to be grilled can, as of this moment, be placed onto the grill, the smoke produced by the grease that drops onto the fire is carried along by the above-described suction, as is shown by the arrows.

A ventilation aperture can be controlled and regulated in the chamber, first for accelerating the lighting of the fire itself, and then for adjusting the suction that causes the inversion of the flames.

An example of an embodiment of this controllable ventilation aperture is illustrated in FIG. 3: holes (7) are provided on the rear side wall of said chamber, other holes (8) are provided on a sliding tongue or platelet. The two units of holes (7) and (8) are of the same size and are disposed in the same manner in such a way that by moving the said tongue, the two units of holes can be superposed, and thus give a maximum opening, or the units of holes can be interstaged and thus prevent a communication between the chamber and the atmosphere.

In order to accelerate the lighting, said ventilation aperture is open to the maximum; the air of the atmosphere enters via this ventilation aperture and feeds the fire, which resembles the functioning of a traditional barbecue.

In order to adjust the suction caused by the ascending air current, while cooking, this ventilation aperture is controlled by operating the tongue (9) in such a way that one solely deflects the produced smoke. This eliminates the exposure of the food to be grilled to an excessively cold and unnecessary air current.

In fact, in the absence of such a suction, the melted grease drops that fall onto the burning fire, more or less, produce a smoke. This smoke comprises denatured grease droplets as well as solid particles coming from the coal itself, and these matters, which are heavier than air, are carried along by the rising hot current.

Thus, it is sufficient to decelerate the speed of this current in order that these particles fall and are evacuated with the air current created in the conduit. This explains the interest to be able to regulate the air suction, under the effect of ascending hot air current in the conduit, in such a way that the smoke produced be simply deflected. In this configuration, the necessary heat for the cooking of the food will be furnished in part by the balance of the hot current, free of smoke, which rises toward the food, and in part by the radiation either of the wall of the conduit or of the fire itself.

In order to accelerate the starting of the current rising in the conduit, the conduit can be tilted toward the coal support. This form of embodiment is not illustrated.

In the two cases, in case of a vertical or an inclined conduit and for the same reason stated above, i.e. the acceleration of the formation of the air current ascending in the conduit, this can be completed by a second part which is more inclined toward the coal support and followed by a third vertical part for the exit of the smoke.

It is shown in FIG. (2) a conduit which is composed of a first vertical part (3a), of a second inclined part (3b), and of a third vertical part (3c).

A parallel embodiment, which is not shown, can be carried out, where the first part is inclined toward the coal support, a second part is more inclined toward the same support and, finally, a third part is vertical.

It is self-evident that other forms of embodiment can be contemplated without having to look outside the scope of the present invention, i.e. the deflection of smoke produced by a suction created by an ascending air current created in a conduit heated by the fire of the barbecue.

What is claimed is:

1. Portable or fixed barbeque of the type comprising a coal support, permeable to air, to carry the coal or equivalent to be burned, below which is disposed an exhaust chamber and above which is disposed a grill carrying food to be grilled, wherein attached to the coal support is an upper wall having two sides, one side facing the coal support and exposed to radiant heat from said coal support, and a second side forming an interior wall of a rising exhaust conduit, where the upper wall is thermally conductive such that during operation of the barbeque combustion air descends through the coal support due to suction in the exhaust chamber caused by heated air rising in the exhaust conduit.

2. Barbecue according to claim 1, wherein said exhaust conduit has a tubular flat form including two large walls where one of the two large walls is the upper wall and is situated adjacent the coal support and is thermally conductive.

3. Barbecue according to claim 1, wherein the exhaust conduit at its base communicates with the exhaust chamber, said exhaust conduit having an inlet end and an exhaust output end and having a larger cross-section at said inlet end than at said exhaust output end, where the smoke is exhausted into the air.

4. Barbecue according to claim 1, wherein said exhaust conduit has an inlet end and an exhaust output end, said exhaust conduit having a rectangular cross-section which decreases from said inlet end toward said exhaust output end.

5. Barbecue according to claim 1, wherein a lower part of said exhaust conduit is vertically attached to the exhaust chamber with the upper wall.

6. Barbecue according to claim 4, wherein a lower part (3a, 3b) of said exhaust conduit attached to the exhaust chamber with the upper wall is inclined toward the chamber.

7. Barbecue according to claim 5, wherein the said exhaust conduit is formed by a single part, either vertical or inclined.

8. Portable or fixed barbecue of the type comprising a coal support, permeable to air, to carry the coal or equivalent to be burned, below which is disposed an exhaust chamber and above which is disposed a grill carrying food to be grilled, wherein said coal support includes a wall of said exhaust chamber in communication with a rising exhaust conduit, where said wall of the chamber is thermally conductive and is attached to the coal support and has two sides, one side facing the coal and a second side forming an interior wall of said exhaust conduit, wherein a lower part of the said conduit is vertical or inclined, where said lower part is attached to the chamber;
wherein a second part inclined toward the chamber is attached, at the upper end of said lower part, and
wherein a third part is attached vertical at an upper end of the second part.

9. Barbecue according to claim 1, wherein the exhaust chamber includes a wall which is outfitted with a controllable air-ventilation aperture.

10. Barbecue according to claim 9, wherein the said controllable air-ventilation aperture is formed by several holes placed on one of the side walls of the chamber which cooperates with several holes of the same shape and the same placing, made on a sliding tongue, in such a way that upon moving the said tongue, the two assemblies of holes can be superposed gradually thus making the interior of the chamber communicate or not communicate with the atmosphere.

11. A barbecue of the type comprising an air-permeable support to carry coal to be burned; an exhaust chamber disposed below said coal support; a grill disposed above said coal support to carry food to be grilled;
wherein drops of fat fall onto the burning coal and thereby produce smoke; and wherein the barbecue comprises, for preventing the smoke from rising and thereyby contacting the food to be grilled, the following elements a chamber forming a coal support;

an upper wall having two sides attached to the chamber;

an exhaust conduit, where the exhaust conduit is attached to one side of the upper wall and disposed opposite to the coal support which is attached to the second side of said upper wall, wherein the exhaust conduit is thermally conductive at least on a side close to the coal support, and wherein the exhaust conduit communicates, on the one hand, with the chamber and, on the other hand, with the atmosphere, wherein a rising hot-air current is created in the exhaust conduit provoking a reduced pressure in the chamber and, consequently, a suction in a downward direction down through the coal support thereby forcing said smoke to descend into the chamber from where it is evacuated upwardly by the exhaust conduit through the effect of the hot air current.

12. The barbecue according to claim 11, wherein the exhaust conduit has a flat tubular shape and exhibits two large side walls, where at least one of said side walls is thermally conductive, where the exhaust conduit communicates with the chamber in such a way that the large, thermally-conductive side wall, disposed on the side of the coal support, thereby induces a thermal exchange between the coal and the interior of this exhaust conduit.

13. The barbecue according to claim 11, wherein the exhaust conduit is disposed inclined toward the coal support in order to induce the thermal exchange between the burning coal, vertically emitting heat, and the exhaust conduit.

14. The barbecue according to claim 11, wherein the exhaust conduit is formed in continuity by three parts, a first vertical part, a second part attached with its lower end to the upper end of the first vertical part and inclined toward the coal support, and a third vertical part attached with its lower end to an upper end of the second part.

15. The barbecue according to claim 11, wherein the exhaust conduit is formed by three parts, a first part inclined toward the coal support, a second part attached with its lower end to the upper end of the first vertical part and more inclined toward the coal support than the first part, and a third vertical part attached with its lower end to an upper end of the second part.

16. The barbecue according to claim 11, wherein, in order to control a suction flow in an up-down direction through the coal support, the exhaust chamber is furnished with a controllable air vent, which air vent permits the atmospheric air to enter the chamber and to feed a hot-air current rising in the exhaust conduit, wherein the rising hot-air current is formed, in this case, by the air coming from the controllable air vent and from the suction current downwardly through the coal support.

17. The barbecue according to claim 16, wherein the air vent is furnished in a side wall of the exhaust chamber closest to the exhaust conduit.

18. The barbecue according to claim 17, wherein the controllable air vent is formed by several aperture holes disposed on a side wall of the exhaust chamber, which aperture holes cooperate with several holes of the same shape and a corresponding disposition, made on a sliding tongue, in such a way that the two sets of holes can be gradually superposed upon actuating of the said tongue and thus the interior of the chamber is switched between communicating or not communicating with the atmosphere.

* * * * *

UNITED STATES PATENT AND TRADEMARK OFFICE
CERTIFICATE OF CORRECTION

PATENT NO. : 4,907,568

DATED : March 13, 1990

INVENTOR(S) : Thierry Pibernat

It is certified that error appears in the above-identified patent and that said Letters Patent is hereby corrected as shown below:

- Col. 2, line 41, delete "which is not shown," and substitute therefor --which is shown in Fig. 4--.

- Col. 3, line 36, delete "this form of embodiment is not illustrated," and substitute therefor --this form of embodiment is illustrated, in Fig. 2B--.

- Col. 3, line 38, after "a vertical" insert --(Fig. 2A)--.

- Col. 3, line 39, after "conduit" insert --(Fig. 2B)--.

- Col. 3, line 44, after "smoke" insert --(Fig. 2E and 2D)--.

- Col. 3, line 48, delete "which is not shown," and substitute therefor --which is shown in Fig. 2D--.

UNITED STATES PATENT AND TRADEMARK OFFICE
CERTIFICATE OF CORRECTION

PATENT NO. : 4,907,568

DATED : March 13, 1990

INVENTOR(S) : Thierry Pibernat

It is certified that error appears in the above-identified patent and that said Letters Patent is hereby corrected as shown below:

- Col. 3, line 52, after "is vertical." insert --It is also shown in Fig. 2C a conduit which is composed of a first curved part and a second vertical part.--.

Signed and Sealed this

Twenty-seventh Day of August, 1991

Attest:

HARRY F. MANBECK, JR.

Attesting Officer

Commissioner of Patents and Trademarks